US009365396B2

(12) United States Patent
Benson et al.

(10) Patent No.: US 9,365,396 B2
(45) Date of Patent: Jun. 14, 2016

(54) APPARATUS AND METHOD FOR PERFORMING A TIMED AND CONTROLLED MOVEMENT AND POSITIONING OF AN OBJECT

(71) Applicant: Hard Rock Cafe International (USA), Inc., Orlando, FL (US)

(72) Inventors: Michael Benson, Memphis, TN (US); Gilberto Alex Merchan, Nashville, TN (US)

(73) Assignee: HARD ROCK CAFE INTERNATIONAL (USA), INC., Orlando, FL (US)

( * ) Notice: Subject to any disclaimer, the term of this patent is extended or adjusted under 35 U.S.C. 154(b) by 0 days.

(21) Appl. No.: 14/025,412

(22) Filed: Sep. 12, 2013

(65) Prior Publication Data

US 2014/0017050 A1 Jan. 16, 2014

Related U.S. Application Data

(63) Continuation of application No. 12/732,712, filed on Mar. 26, 2010, now abandoned.

(60) Provisional application No. 61/164,043, filed on Mar. 27, 2009.

(51) Int. Cl.

| | |
|---|---|
| ***G03B 21/14*** | (2006.01) |
| ***B66C 13/00*** | (2006.01) |
| ***A63J 5/00*** | (2006.01) |
| ***G09F 19/18*** | (2006.01) |
| ***G09F 21/04*** | (2006.01) |
| ***G09F 27/00*** | (2006.01) |

(Continued)

(52) U.S. Cl.
CPC ................. *B66C 13/005* (2013.01); *A63J 5/00* (2013.01); *B66C 13/18* (2013.01); *B66C 25/00* (2013.01); *G09F 19/18* (2013.01); *G09F 21/04* (2013.01); *G09F 27/00* (2013.01)

(58) Field of Classification Search
CPC .......... B66C 13/00; B66C 13/18; B66C 25/00
USPC ......... 353/122; 710/1; 362/362, 383; 40/442; 396/429–434; 348/14.01–14.16
See application file for complete search history.

(56) References Cited

U.S. PATENT DOCUMENTS 5,598,208 A * 1/1997 McClintock .................. 348/159
6,260,989 B1 * 7/2001 Ingraselino ................... 362/383

(Continued)

FOREIGN PATENT DOCUMENTS

WO WO 97/34282 9/1997

OTHER PUBLICATIONS

International Search Report mailed May 20, 2010, issued in International Application No. PCT/US2010/028864 filed Mar. 26, 2010.

(Continued)

*Primary Examiner* — Sultan Chowdhury
*Assistant Examiner* — Danell L Owens
(74) *Attorney, Agent, or Firm* — Drinker Biddle & Reath LLP

(57) ABSTRACT

A method and apparatus for lowering a display object in synchronization with a particular timing or event. The display object is lowered by a lifting apparatus. In particular, the display object is a guitar and the lifting apparatus is a crane.

21 Claims, 1 Drawing Sheet

(51) Int. Cl.
*B66C 13/18* (2006.01)
*B66C 25/00* (2006.01)

(56) References Cited

U.S. PATENT DOCUMENTS

| | | | |
|---|---|---|---|
| 2002/0043632 | A1 | 4/2002 | Miramonti et al. |
| 2002/0148147 | A1* | 10/2002 | Francis ........................... 40/426 |
| 2004/0205256 | A1* | 10/2004 | Hoffman et al. .................. 710/1 |
| 2007/0047949 | A1 | 3/2007 | Gluck |
| 2007/0291184 | A1 | 12/2007 | Harville et al. |
| 2008/0136796 | A1 | 6/2008 | Dowling |
| 2009/0076986 | A1 | 3/2009 | Cronin et al. |

OTHER PUBLICATIONS

News Article: WMC-TV NBC (TN), Action News 5 at 5 a.m.—(Aired Jan. 1).
News Article: WREG-TV CBS (TN), "News Channel 3 at 11 p.m."—(Aired Dec. 31).
News Article: Memphis Bizjournals Online (TN), "Balloons, Confetti, 100-Foot Guitar Drop to Ring in New Year Downtown"—(Ran Dec. 26).
Middletown Journal Online, "Photo Galleries"—(Ran Dec. 28).
Times Square Alliance—New Year's Eve Ball, Internet Article [Online], URL:http//www.timessquarenyc.org/nye/nye_ball.html Jun. 28, 2010, pp. 1-4.
New Year's Eve—Wikipedia, the free encyclopedia, Internet Article [Online], URL:http//en.wikipedia.org/wiki/New_Year's_Eve, Jun. 28, 2010, p. 1.
Wan, William, "Forget the Big Apple—Drop a Peach", The Washington Post, Internet Article [Online], URL:http://www.washingtonpost.com/wp-dyn/content/article/2008/12/30/AR2008123003279_p... June 28, Dec. 31, 2008, pp. 1-3.

* cited by examiner

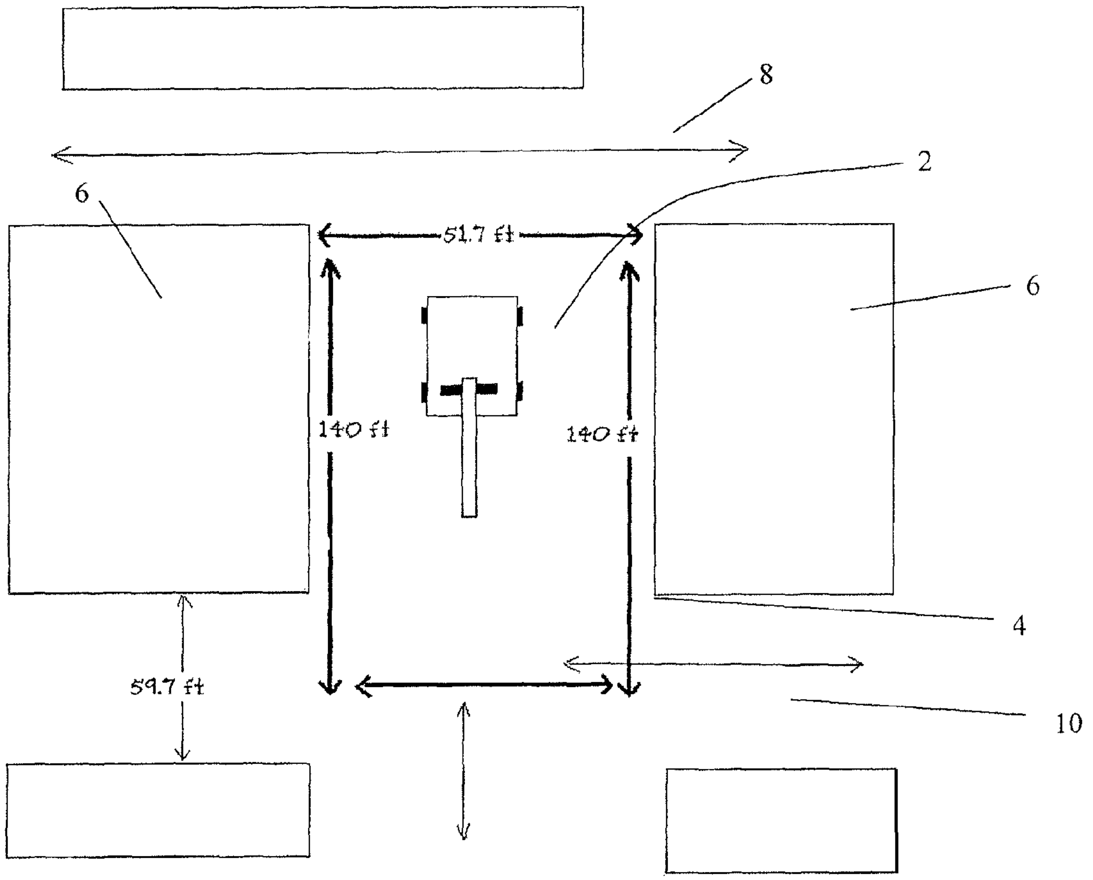
8
2
6
51.7 ft
6
140 ft
140 ft
4
59.7 ft
10

APPARATUS AND METHOD FOR PERFORMING A TIMED AND CONTROLLED MOVEMENT AND POSITIONING OF AN OBJECT

CROSS-REFERENCE TO PRIOR APPLICATION

This application claims benefit from U.S. Provisional Application No. 61/164,043 filed Mar. 27, 2009, the entire content of which is incorporated herein by reference.

FIELD

The present disclosure relates to an apparatus and method for performing timed and controlled movement and positioning of a display object, such as the controlled descent of a display object, to correlate with particular events and themes, such as a New Year's Eve countdown or achievement of a goal, such as correlating the height to the amount of donations collected for a particular cause.

SUMMARY

An exemplary apparatus and method comprises the steps of attaching a display object, with sufficient size for visibility by spectators, to a lifting apparatus having sufficient lifting power and height to hold the display object at a height sufficient for visibility by spectators, and performing a timed and controlled movement and positioning of the object, such as raising and lowering the object while attached to a lifting apparatus at a rate synchronized with a desired timing. The object may be affixed or connected to the raising and lowering mechanism through a cradle, coupling or linking to a cable in a manner to enable or facilitate rotation of the object. The object may also house or support any of the following or any combinations of any of them: illuminating elements, surfaces upon which projections may be made, projection mechanisms, screens or monitors for display of images, and recording, camera and filming elements. The object may also house audio elements via which sounds, such as music, may be stored, received and played.

A preferred exemplary apparatus and method comprises attaching a decorated guitar or oversized model of a guitar by a canvas rope attached to a movable crane with sufficient size for visibility by spectators in an urban or festival environment, raising the guitar and subsequently lowering the guitar at a rate synchronized to a clock.

It is to be understood that both the foregoing general description and the following detailed description are exemplary and explanatory and are intended to provide further explanation of the invention as claimed.

BRIEF DESCRIPTION OF THE DRAWING

The following detailed description can be read in connection with the accompanying drawings in which like numerals designate like elements and in which:

FIG. 1 shows a schematic top view of an exemplary embodiment of a site in which a guitar is lowered.

DETAILED DESCRIPTION

Many events include countdowns to build the excitement surrounding the initiation of an event. Events utilizing countdowns include, for example, grand openings for stores, parks, and other locations. A well known event utilizing a countdown is New Year's Eve, in which people count down to the second that the New Year begins. The building excitement produced by a countdown can be increased by a method of, and apparatus for, lowering a display object in sync with the final count.

An exemplary embodiment of the apparatus and method includes attaching a music related object to a lifting and lowering apparatus. The music related object can be selected from a range of inanimate objects that are related to music, such as musical instruments, or animated, music-related objects, such as a player piano. The music-related object can include any musical instrument or model of a musical instrument, music notations or likeness of a individual, such as a famous musician. Examples of the musical instrument include pianos, guitars, drums, saxophones, and any other known musical instrument. In an exemplary embodiment, the music-related object is a guitar.

The display object is formed of any material. In an exemplary embodiment the material is a transparent or translucent material such as fiberglass. The display object is selected based on the environment surrounding the event in which the timed and controlled movement is performed. The display object may be selected to correlate with, for example, the type of event, location of the event, or timing of the event. For example, in one embodiment the display object is a music related object, and more particularly a guitar at a New Year's Eve countdown in Memphis hosted by Hard Rock Café. The guitar has significance in rock and roll, and Memphis and Hard Rock Café both play significant roles in rock and roll music.

In one use, the display object is sufficiently large, and brought to an elevation, to be seen by a large crowd of people at a significant distance, i.e., a distance that, based on the site of use, is sufficient to be seen by members of a crowd in that environment or that can be attracted to that environment. The display object can be at least 10 feet long, or more preferably at least 20 feet long. However, the display object size is determined based on the location of the event, size of the crowd, and other factors used to ensure that people present at the display can effectively view or be drawn to it. Further, the display object can be decorated in a manner corresponding to the event in which the display object will be lowered. The display object can be decorated with green shamrocks for St. Patrick's Day or red, white, and blue streamers for $4^{th}$ of July. An exemplary embodiment includes providing the incoming year and/or outgoing year at a New Year's Eve countdown on at least one portion of the display object in numbers sufficiently large for spectators at a significant distance to see. For example, if the display object is a guitar, then the year is written on the neck of the guitar. Decorations can also include lights positioned in proximity to the display object to illuminate the display object. Examples of such lighting include spot lights focused on the display object.

The display object may further house or support illuminating elements including neon lighting, strobe lights, conventional bulb lighting or other known lighting schemes for illuminating an object. The lights can be powered by known methods of batteries and/or electrical connection via the attachment of the display object to the lifting apparatus. The lights can be controlled via switches and other light controlling features such as dimmers, which can be independently controlled manually or by automation. The control for the lights may be within the display object, in the lifting apparatus, or at a control center. The display object may further support or house mirrors or other suitable surfaces to reflect and enhance the light provided by the proximity lighting or the illuminating elements housed or supported by the display object. The enhanced lighting produced by the mirrors or surfaces can provide a sensation of light moving as the display object rotates, swings and/or vertically moves. In addition, the mirrors and reflective surfaces can help increase the intensity of the light allowing for greater visibility with decreased power output.

The display object may further support surfaces or consist in whole or part of surfaces upon which projections from a separate projector or group of projectors may be projected. The projection surfaces could include any surface known to enable a visible projection. Further, the display object may house or support projection mechanisms for projecting images upon surrounding objects. One embodiment includes a projection mechanism for projecting images onto surrounding buildings and other structures. The projection mechanism may be connected to a device that stores and plays images that are housed within the display object, in the lifting apparatus or transmitted from a separate location. The image storing and playing device is connected to the projection mechanism via wired or wireless connection.

The music-related object may further support or house screens or monitors for displaying images. Display monitors such as LCD panels or other conventional display monitors may be installed on the outer surfaces of the display object. The display monitors can be connected to a multimedia player located within the display object, within the lifting apparatus, or at a central location. The display monitors are connected to the multimedia play by either a wired or wireless connection. The multimedia player can include, for example, a DVD player, Blu-ray player, player for an image containing CD, computer, or any other device capable of outputting signals for image creation to the display monitors.

The display object may further support or house recording, camera and filming elements. A unique perspective of the event can be captured for later viewing or transmittal to spectators of the event, whether physically at the location or not. Recording, camera, and/or filming elements can be installed on and in the display object. The image captured by the camera or other recording device may be recorded onto physical or digital media housed within the camera, display object, or at a separate location or locations after being transmitted from the camera via a wired or wireless connection. The captured image may also be transmitted by conventional methods to other projectors positioned throughout the spectator area enabling enlarged projection of the image to screens for spectator enjoyment. By further conventional methods the captured image may be transmitted to remote locations through wired or wireless connections, such as broadcasting to televisions in remote locations.

The display object may further house audio elements used to produce sounds, such as music or speech. The audio elements can include speakers, receivers, and electronic equipment for inputting the signals to the receiver. Examples of input devices for the music or sounds include, for example, CD players, MP3 players, computers, microphones, and other similar digital or mechanical devices. The receiver and accompanying electronic equipment can be housed within the display object, within the lifting apparatus, or at a separate location or locations. The connections between the individual audio elements can be wired or wireless.

Although each of the individual elements listed above that can potentially be supported or housed in the display object can be operated independently, combinations of some or all of the individual elements can be connected to a separate location or locations. A location can be within the lifting apparatus, at separate locations, or a combination of such locations. The separate location can include at least one synchronizing and controlling device such as a computer, for integrating any combinations of the following elements described in detail above: the illuminated elements, projections, monitor displays, recording, camera, and filming elements, and audio elements. Further, the separate location can be used to manually control each of the abovementioned devices.

The lifting and lowering apparatus to support the object has sufficient lifting power to hold and perform a timed vertical movement or movements of the object. The lifting apparatus can be mobile or stationary and temporary or permanent to the location. In one embodiment, the lifting apparatus is a temporary and mobile industrial crane. The temporary and mobile industrial crane can have the ability to lift at least 60 tons. However, the size and lifting power of the lifting apparatus is determined based on the size and weight of the display object, the elevation desired, the speed at which the object is raised and/or lowered, and other factors effecting lifting strength. In another embodiment, the lifting apparatus is a scaffold hoisting apparatus. In use, the scaffold hoisting apparatus is a scaffolding wider than the display object. The display object is attached such that it can be hoisted and lowered according to predetermined speeds. In some embodiments, the extra width of the scaffolding can be utilized to add lighting running down the length of the scaffolding on either side of the display object. Further, the scaffolding can be used to support the audio/visual components described above. For visibility purposes, the lifting apparatus has a height sufficient to hold the object above the height of obstacles that would impede visibility to spectators or otherwise position the display object in a manner that the adverse affect on the visibility of the display object is, to the extent practicable, lessened. Obstacles include man-made structures, such as buildings and towers, as well as natural obstacles such as trees. The height required for optimum visibility depends on the surroundings. The lifting apparatus can be placed in urban, suburban, rural, and/or any other environment in which people congregate or are attracted to witness an event. The lifting and lowering can also be performed on movable objects of sufficient size to accommodate the lowering area and lifting apparatus, including a vehicle, cruise ship or other vessel.

The object is affixed or connected to the lifting apparatus by any suitable mechanical or chemical means. The mechanical attachment can include connecting the object directly to a lifting apparatus, such as scaffolding, or connecting to a cradle of the lifting apparatus by coupling or linking to a cable. In an exemplary embodiment the coupling enables or facilitates rotation of the object. The coupling can include linking to a cable, strap, belt, rope, and the like. In a preferred exemplary embodiment the mechanical attachment is a canvas rope.

The display object can be raised and lowered at one fixed speed or at a variable speed. For example, the display object may slow down or speed up as it moves downward and may also be periodically halted and raised during the display. Further, the lifting apparatus can be configured to lower the display object with intermittent stops during the controlled vertical movement for dramatic pauses. Also, the display object may be raised upward during the controlled vertical movement. The upward movement could, for example, provide a dramatic pause, or make the display object appear to be attached to an elastic cord, such as a bungee cord. The speed at which the display object is vertically moved is determined based on spectator appeal. The object can be lowered slowly to encourage participation in a slow countdown, or the object can be lowered quickly to provide the spectators with the excitement of watching a large object lower quickly. In one embodiment the speed for lowering the display object is at least 6 feet per second.

The lifting apparatus can be manually controlled during the vertical movement with different speeds selected for dramatic effect. In a further embodiment, the lifting apparatus can be automatically controlled by a controller that is synchronized with a clock for countdown purposes. The controller can be integrated with a visible display of a clock for spectators. The visible display can be an independent device, or can be the monitor displays, or other projections either supported on, or housed within the display object. The controller synchronizing the clock and lifting apparatus can act independently from or be integrated with the synchronizing and controlling device. The controller can further be integrated with a distribution mechanism for deploying any combination of fireworks, pyrotechnics, a laser show, a light show, confetti, balloons, or the like.

Depending on the type of control used to perform the lowering, the controller can include both manual and automatic timing systems. For example, a manual timing system includes a clock visible by the operator of the lifting apparatus to allow the operator to time the lowering to a certain time displaying on the clock. An exemplary automatic timing system includes an automated control of the lifting apparatus linked to a clock programmed to engage the lowering sequence at a certain time.

For safety reasons, based on the size of the lifting apparatus and object to be lowered, the timed lowering is performed in a location with sufficient separation from spectators and surrounding buildings. An exemplary embodiment of a location for such a lowering is shown in FIG. 1. FIG. 1 includes a schematic top view of an exemplary lowering location. The lowering location includes a lowering area 4 with a crane 2 for lowering the display object within the lowering area 4. Two sides of the lowering area 4 are adjacent two buildings 6, and the other two sides of the lowering area are adjacent a street 10 and alley 8, respectfully. The lowering area 4 preferably is a rectangular area containing opposing sides of 51.7 feet each and two further opposing sides of 140 feet each.

Although described in connection with preferred embodiments thereof, it will be appreciated by those skilled in the art that additions, deletions, modifications, and substitutions not specifically described may be made without departure from the spirit and scope of the invention as defined in the appended claims.

What is claimed is:

1. A method comprising the steps of:
- attaching a display object having the shape of a musical instrument, in which the largest dimension of the display object is at least 10 feet long, to a lifting apparatus capable of lifting at least 60 tons;
- capturing images using at least one recording device housed in the display object or attached to the lifting apparatus;
- projecting images captured by the at least one recording device onto surrounding buildings and other structures using a projection mechanism housed within the display object;
- performing a timed and controlled vertical movement and positioning of the display object while attached to the lifting apparatus at a rate synchronized with a desired timing, while allowing the display object to rotate freely before and during the time and controlled vertical movement and positioning of the display object,
- wherein the display object is attached to the lifting apparatus by a cable, strap, belt, or rope.

2. The method according to claim 1, wherein the timed and controlled vertical movement and positioning includes raising and/or lowering the display object.

3. The method according to claim 1, further comprising illuminating the display object.

4. The method according to claim 3, wherein the illuminating step includes illuminating elements, projection mechanisms, or screens or monitors connected to the display object.

5. The method according to claim 3, wherein the illuminating step includes reflecting or projecting illumination or images onto surfaces of the display object.

6. The method according to claim 1, further comprising filming by using at least one camera attached to the lifting apparatus or at an external location in proximity to the display object.

7. The method according to claim 6, further comprising displaying on the display object images from the at least camera or the at least one recording device.

8. The method according to claim 6, further comprising transmitting images for display at a location remote from the display object images from the at least camera or the at least one recording device.

9. The method according to claim 1, further comprising obtaining audiovisual recording by using audiovisual recording devices housed in the display object, attached to the lifting apparatus, or at an external location in proximity to the display object.

10. The method according to claim 9, further comprising using the audiovisual input on the display object.

11. The method according to claim 9, further comprising transmitting the audiovisual input for use at a location remote from the display object.

12. The method according to claim 1, further comprising creating and/or amplifying sounds or music that are synchronized to the timed and controlled movement.

13. The method according to claim 12, wherein the sounds or music are amplified from the display object.

14. An apparatus for performing a timed and controlled vertical movement and positioning of a display object having sufficient size for visibility by spectators, the system comprising:
- a display object having the shape of a musical instrument and having a largest dimension with a length of at least 10 feet;
- a lifting apparatus capable of lifting at least 60 tons;
- a connection that attaches the display object to the lifting apparatus such that the display object rotates freely before and during the timed and controlled vertical movement and positioning of the display object, wherein the connection is a cable strap, belt, or rope;
- a synchronizing device for performing a timed and controlled vertical movement and positioning of the display object at a desired time and speed;
- a recording device housed in the display object or attached to the lifting apparatus that captures images; and
- a projection mechanism housed within the display object that projects images captured by the recording device onto surrounding buildings and other structures.

15. The apparatus according to claim 14, wherein the lifting apparatus is configured to raise and/or lower the display object during the timed and controlled vertical movement and positioning.

16. The apparatus according to claim 14, wherein the display object includes illuminating elements, surfaces upon which projections may be made, projection mechanisms, or screens or monitors for display of images, or combinations thereof.

17. The apparatus according to claim 14, wherein the apparatus includes recording, camera, or filming elements, or combinations thereof.

18. The apparatus according to claim 17, wherein the display object houses or supports recording, camera, or filming elements, or combinations thereof.

19. The apparatus according to claim 14, wherein the apparatus includes devices for creating, amplifying, or playing sounds or music, or combinations thereof.

20. The apparatus according to claim 19, wherein the devices for creating, amplifying, or playing sounds or music are housed or supported by the display object.

21. The apparatus according to claim 14, wherein the synchronizing device synchronizes the timed and controlled vertical movement and positioning of the display object with any combination of a timing mechanism, illuminating or projecting elements, sound or music devices, or recording or filming elements.

* * * * *